US010732959B2

(12) United States Patent
Jayaraman et al.

(10) Patent No.: US 10,732,959 B2
(45) Date of Patent: Aug. 4, 2020

(54) PRE AND POST UPDATE VEHICLE BUS TRAFFIC FINGERPRINTING

(71) Applicant: FORD GLOBAL TECHNOLOGIES, LLC, Dearborn, MI (US)

(72) Inventors: Vijayababu Jayaraman, Novi, MI (US); Jonathan Nibert, Livonia, MI (US); Karl Nathan Clark, Belleville, MI (US); Mohamad Nasser, Dearborn Heights, MI (US); Jason Michael Miller, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/162,918

(22) Filed: Oct. 17, 2018

(65) Prior Publication Data

US 2020/0125349 A1    Apr. 23, 2020

(51) Int. Cl.
| | |
|---|---|
| *G06F 9/44* | (2018.01) |
| *G06F 8/65* | (2018.01) |
| *G07C 5/00* | (2006.01) |
| *H04L 12/26* | (2006.01) |
| *H04L 12/40* | (2006.01) |
| *G07C 5/08* | (2006.01) |

(52) U.S. Cl.
CPC .............. *G06F 8/65* (2013.01); *G07C 5/008* (2013.01); *G07C 5/0808* (2013.01); *H04L 12/40* (2013.01); *H04L 43/04* (2013.01); *H04L 2012/40273* (2013.01)

(58) Field of Classification Search
CPC .. G06F 8/61; G06F 8/65; G07C 5/008; G07C 5/0808; H04L 12/40; H04L 2012/40273; H04L 43/04
USPC .................................................. 717/168-178
See application file for complete search history.

(56) References Cited

U.S. PATENT DOCUMENTS

| | | | | |
|---|---|---|---|---|
| 9,841,965 | B2 * | 12/2017 | Moeller | G06F 8/65 |
| 10,042,635 | B2 * | 8/2018 | Moeller | H04L 67/12 |
| 10,127,036 | B2 * | 11/2018 | Moeller | G06F 8/654 |
| 2014/0006555 | A1 * | 1/2014 | Shields | H04L 67/12 |
| | | | | 709/217 |
| 2016/0371076 | A1 * | 12/2016 | Moeller | H04L 67/34 |
| 2018/0113703 | A1 | 4/2018 | Tschache | |
| 2018/0152341 | A1 | 5/2018 | Maeda et al. | |

OTHER PUBLICATIONS

Michael L. Sena, "Secure Over-the-Air Vehicle Software Updates—Operational and Functional Requirements", 2015, International Telecommunication Union, pp. 1-44 (Year: 2015).*

(Continued)

*Primary Examiner* — Ted T. Vo
(74) *Attorney, Agent, or Firm* — Michael J. Spenner; Brooks Kushman P.C.

(57) ABSTRACT

A software update is downloaded from an update server responsive to an update trigger. A pre-installation bus traffic fingerprint is created responsive to completing the download. The software update is installed to the vehicle responsive to creating the pre-installation bus traffic fingerprint. A post-installation bus traffic fingerprint is created responsive to installing the software update. Success of the install is indicated to the update server based on comparing the pre-installation and post-installation bus traffic fingerprints.

15 Claims, 2 Drawing Sheets

(56) References Cited

OTHER PUBLICATIONS

Daimi et al., "Securing Vehicle ECUs Update Over the Air", 2016, AICT, The Twelfth Advanced International Conference on Telecommunications, pp. 45-50 (Year: 2016).*
Mckenna et al., "Making Full Vehicle OTA Updates a Reality" 2016, NXP Semiconductors N.V. , 14 pages. (Year: 2016).*

* cited by examiner

US 10,732,959 B2

PRE AND POST UPDATE VEHICLE BUS TRAFFIC FINGERPRINTING

TECHNICAL FIELD

Aspects of the disclosure generally relate to capturing vehicle bus traffic before and after installation of a software update to identify success of the update.

BACKGROUND

Automobile diagnostic data, such as Diagnostic Trouble Codes (DTCs), form compact, informative messages. Diagnostic data was designed to allow vehicle controllers to indicate a system fault and/or a need for repair.

SUMMARY

In one or more illustrative examples, a system includes a processor of a vehicle programmed to create a pre-installation bus traffic fingerprint before installing a software update, install the software update to the vehicle, create a post-installation bus traffic fingerprint after installing the software update, compare the pre-installation bus traffic fingerprint and the post-installation bus traffic fingerprint to identify success of the install of the software update, and indicate the success of the install to an update server.

In one or more illustrative examples, a method includes downloading a software update to a vehicle from an update server responsive to an update trigger; creating a pre-installation bus traffic fingerprint responsive to completing the downloading; installing the software update to the vehicle responsive to creating the pre-installation bus traffic fingerprint; creating a post-installation bus traffic fingerprint responsive to installing the software update; and indicating success of the install to the update server based on comparing the pre-installation and post-installation bus traffic fingerprints.

In one or more illustrative examples, a non-transitory computer-readable medium comprising instructions that, when executed by a processor of a gateway of a vehicle, cause the gateway to download a software update from an update server responsive to an update trigger; create a pre-installation bus traffic fingerprint responsive to completion of the download, the pre-installation bus traffic fingerprint including data traffic recorded for a predefined number of drive cycles before installation of the software update to the vehicle from subnets of a vehicle network, the recorded data traffic including critical functional messages matched from a listing of critical messages types; install the software update to the vehicle responsive to creation of the pre-installation bus traffic fingerprint; create a post-installation bus traffic fingerprint responsive to installing the software update, the post-installation bus traffic fingerprint including further data traffic recorded for the predefined number of drive cycles after installation of the software update to the vehicle, the further recorded data traffic including critical functional messages matched from the listing of critical messages types; compare the pre-installation and post-installation bus traffic fingerprints; and indicate success of the install to the update server responsive to a result of the comparison.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Current over-the-air (OTA) software update strategies rely on software components unique identifiers (software part numbers) as well as a read, check and verify approach to update validity and compatibility. Even with correct part numbers, vehicle functionality could be degraded after an OTA software update. However, the issue may not be due to the OTA software update itself; instead, the issue may be a result of an untested software components combination or defects introduced in the newly-updated software. In some instances, quality issues may be raised as OTA software update issues.

To address these and other issues, an improved software update procedure may examine a vehicle before and then again after the update is applied to identify a root cause of any identified issues.

For example, a vehicle may receive a trigger for a software update. Responsive to the trigger, the enhanced central gateway begins recording critical functional messages for a predefined number of drive cycles, send out a self-test request to controllers of the vehicle with self-test capabilities, and records the results. The enhanced central gateway may additionally read any indicated DTCs and error codes. This collected information may be used as a pre-update fingerprint for the vehicle bus traffic.

The update may then be installed. After the OTA software update, the enhanced central gateway may again record critical functional messages for a predefined number of drive cycles, send out a self-test request to controllers of the vehicle with self-test capabilities, and record the results. These pre-update and post-update fingerprints may then be compared. If any issues are identified, the user may be advised to service the vehicle. If the pre-update and post-update fingerprint comparison test results indicate success, the vehicle may prompt the user, (e.g., in the vehicle HMI) for feedback. This feedback may, for example, include requests for the user to indicate whether any driving characteristics issues were identified.

Figure 1:
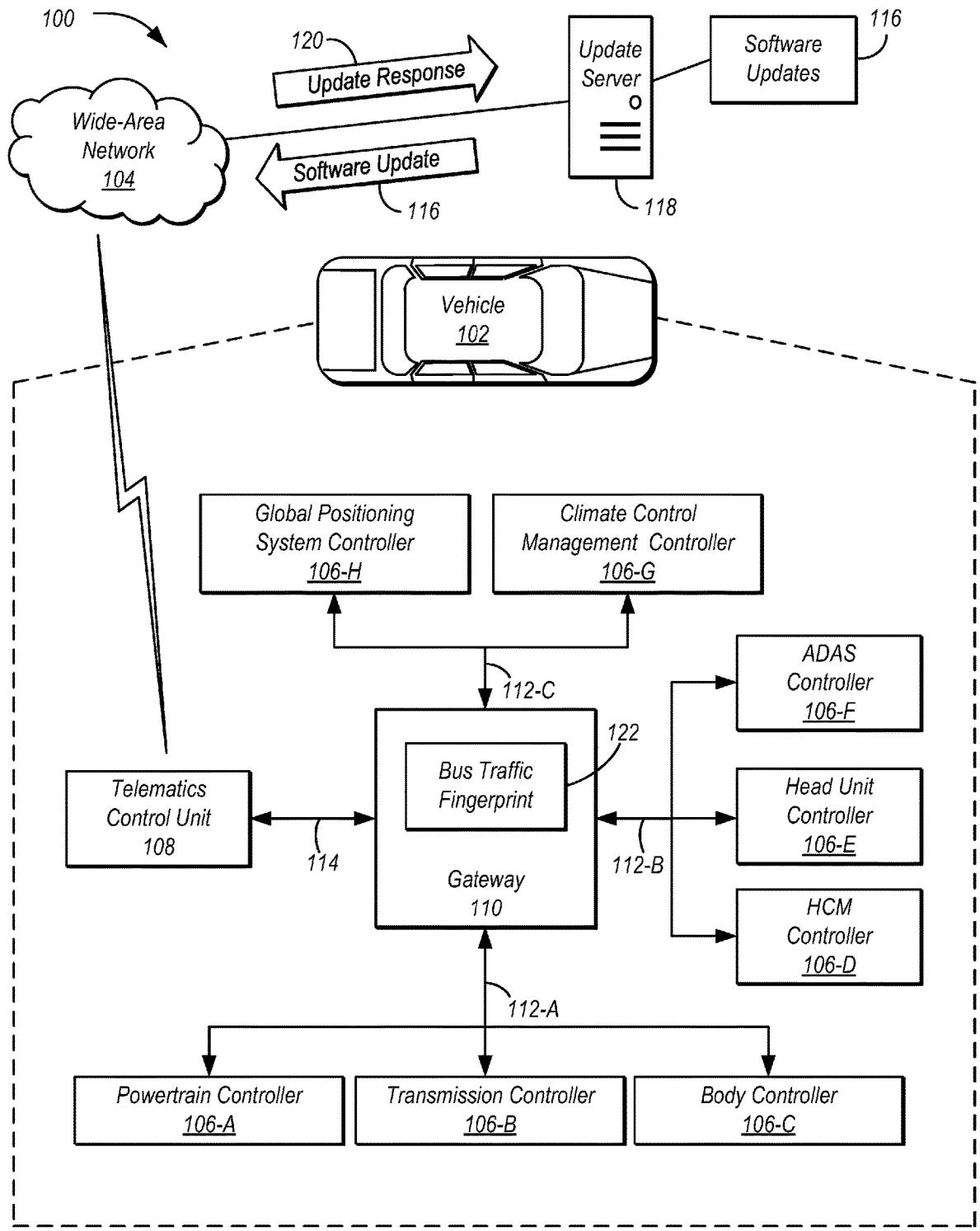
FIG. 1 illustrates an example system implementing pre- and post-update vehicle bus traffic fingerprinting.

FIG. 1 illustrates an example system 100 for pre- and post-update vehicle bus traffic fingerprinting for a vehicle 102. The vehicle 102 includes a plurality of controllers 106, where each is connected to one of a plurality of subnets 112 (as shown subnets 112-A, 112-B and 112-C, each connected to a subset of the controllers 106 (controllers 106-A, 106-B, and 106-C to subnet 112-A, controllers 106-D, 106-E, 106-F connected to subnet 112-B, and controllers 106-G and 106-H connected to subnet 112-C). A telematics control unit (TCU) 108 is included to facilitate communication over a wide-area network 104 between various components of the vehicle 102 and an update server 118 storing software updates 116. The TCU 108 may be connected to a backbone 114 portion of the topology 300 and may communicate with the controllers 106 via a gateway 110. While an example system 100 is shown, the example components as illustrated are not intended to be limiting. Indeed, the system 100 may have more or fewer components, and additional or alternative components and/or implementations may be used. As an example, the controllers 106 and the TCU 108 may each be connected to one or more same or different types of nodes as the subnets 112 and the backbone 114.

The vehicle 102 includes a vehicle, such as, but not limited to, various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the operating characteristics of the vehicle may correspondingly vary. As some other possibilities, vehicle may have different characteristics with respect to passenger capacity, towing ability and capacity, and storage volume.

The wide-area network 104 may include one or more interconnected communication networks such as the Internet, a cable television distribution network, a satellite link network, a local area network, and a telephone network, as some non-limiting examples. By accessing the wide-area network 104, the vehicle 102 may be able to send outgoing data from the vehicle 102 to network destinations on the wide-area network 104 and receive incoming data to the vehicle 102 from network destinations on the wide-area network 104.

The controllers 106 may include various hardware and software components configured to monitor and manage various vehicle functions. The controllers 106 may, accordingly, include one or more processors (e.g., microprocessors) (not shown) configured to execute firmware or software programs stored on one or more storage devices (not shown) of the controllers 106. While the controllers 106 are illustrated as separate components, the vehicle controllers 106 may share physical hardware, firmware, and/or software, such that the functionality from multiple controllers 106 may be integrated into a single controller 106, and the functionality of various such controllers 106 may be distributed across a plurality of controllers 106.

The controllers 106 may include a powertrain controller 106-A configured to manage operating components related to one or more vehicle sources of power, such as engine, battery, and so on, a transmission controller 106-B configured to manage power transfer between vehicle powertrain and wheels, a body controller 106-C configured to manage various power control functions, such as exterior lighting, interior lighting, keyless entry, remote start, and point of access status verification, a headlamp control module (HCM) 106-D configured to control light on/off settings, a head unit controller 106-E configured to drive user interface displays to the user, advanced driver assistance systems (ADAS) 106-F such as adaptive cruise control or automated braking, a climate control management controller 106-G configured to monitor and manage heating and cooling system components (e.g., compressor clutch, blower fan, temperature sensors, etc.), a global positioning system (GPS) controller 106-H configured to provide vehicle location information. It should be noted that these are merely examples and vehicles 102 having more, fewer, or different controllers 106 may be used.

The TCU 108 may include one or more processors (not shown) (e.g., microprocessors) configured to execute firmware or software programs stored on one or more respective storage devices of the TCU 108. The TCU 108 may include a modem or other network hardware to facilitate communication between the vehicle 102 and other devices connected to the wide-area network 104.

The gateway 110 may be configured to facilitate data exchange between vehicle controllers 106. The gateway 110 may be further configured to facilitate data exchange between the vehicle controllers 106 and the TCU 108 located on the backbone 114. In an example, the vehicle controllers 106 and the TCU 108 may communicate with the gateway 110 using CAN communication protocol, such as, but not limited to, a high-speed (HS) CAN, a mid-speed (MS) CAN, or a low-speed (LS) CAN. Different subnets 112 may utilize different CAN protocol speeds. In an example, one or more of the subnets may implement HS-CAN, while one or more other subnets 112 may implement MS-CAN. In yet other examples, the gateway 110 may be configured to facilitate communication using one or more of an Ethernet network, a media-oriented system transfer (MOST) network, a FlexRay network, or a local interconnect network (LIN).

One or more of the subnets 112 may define a main subnet, which may be referred to as a backbone 114. The backbone 114 may include a portion of the topology 300 configured to serve as a joining point of communication for the other subnets 112 of the vehicle 102. Accordingly, the backbone 114 may be configured to manage and route data traffic in a greater volume than that provided via the other subnets 112. Using the message processing features of the gateway 110, the gateway 110 may be configured to transmit message frames between the TCU 108 located on the backbone 114 and the one or more of the vehicle controllers 106 located on the other subnets 112.

The gateway 110 may be configured to identify on which subnet 112 each of the controllers 106 and TCU 108 is located. This may be accomplished according to a corresponding physical network address of the controllers 106 and TCU 108. In an example, in response to receiving a request to route a message to a given controller 106 or the TCU 108, the gateway 110 may query a storage to identify a network address corresponding to the controller 106 or the TCU 108. For instance, the gateway 110 may include a storage configured to store the network addresses, as well as a routing schema defining which messages are routed to which subnets 112 and/or backbone 114. This routing may be determined by the gateway 110 based on predefined parameters included in the message, such as a type of message and/or identifiers of the controllers 106 or the TCU 108 that designate the source and/or target of the message.

The software updates 116 may include software code, configuration settings, and/or data resources to be applied to one or more controllers 106 of the vehicle 102. The update server 118 may include computing hardware configured to provide OTA software update services to the vehicles 102.

The vehicle 102 may provide a configuration of itself to the update server 118. For example, the vehicle 102 may communicate via the wide-area network 104 using queried information about the controllers 106 of the vehicle 102 as well as additional information identifying the specific vehicle 102 (e.g., VIN information published on the CAN bus, subscriber identity module (SIM) information of the TCU 108 such as international mobile station equipment identity (IMEI)). The update server 118 may receive these communications from the vehicle 102 and may maintain a data store of the hardware configurations and software (e.g., firmware) versions linked to identifiers of the vehicle 102.

Based on the vehicle configuration information, the update server 118 may send software updates 116 to the vehicle 102, and/or may provide a trigger or other information to the vehicle 102 to request the vehicle 102 to download the software updates 116.

Responsive to the trigger, the gateway 110 may begin to record data traffic from the subnets 112 indicating critical functional messages for a predefined number of drive cycles. In an example, these critical functional messages may include messages of predefined categories, or messages that are included in a predefined list of messages deemed critical (e.g., error conditions, diagnostic codes, etc.). In another example, the critical messages may include messages that exclude predefined messages or predefined categories of messages that are deemed to be not critical (e.g., engine RPM, vehicle speed, etc.). In addition, the gateway 110 may send self-test requests out over the subnets 112 to controllers 106 of the vehicle 102 with self-test capabilities. This may cause the controllers 106 to perform self-test operations and return the results of the self-tests to the gateway 110 to be recorded by the gateway 110. The gateway 110 may additionally read any indicated DTCs and error codes. This collected information may be compiled into a pre-update bus traffic fingerprint 122.

The software update 116 may then be installed. After installation of the software update 116, the gateway 110 may again record critical functional messages for a predefined number of drive cycles, send out self-test requests to the controllers 106 with self-test capabilities, and record the results. These pre-update and post-update fingerprints 122 may then be compared. If any issues are identified, the user may be advised to service the vehicle 102. If the pre-update and post-update fingerprint 122 comparison test results in success, the vehicle 102 may prompt the user (e.g., in the vehicle 102 HMI) for feedback. This feedback may, for example, include requests for the user to indicate whether any driving characteristics issues were identified.

Responsive to installation of the software update 116, the vehicle 102 may send an update response 120 to the update server 118. The update response 120 may indicate whether installation of the software update 116 was successful. This determination may be based on the pre-update and post-update fingerprint 122 comparison test results. The update response 120 may additionally or alternately include user comments that were received via the vehicle 102 HMI.

Figure 2:
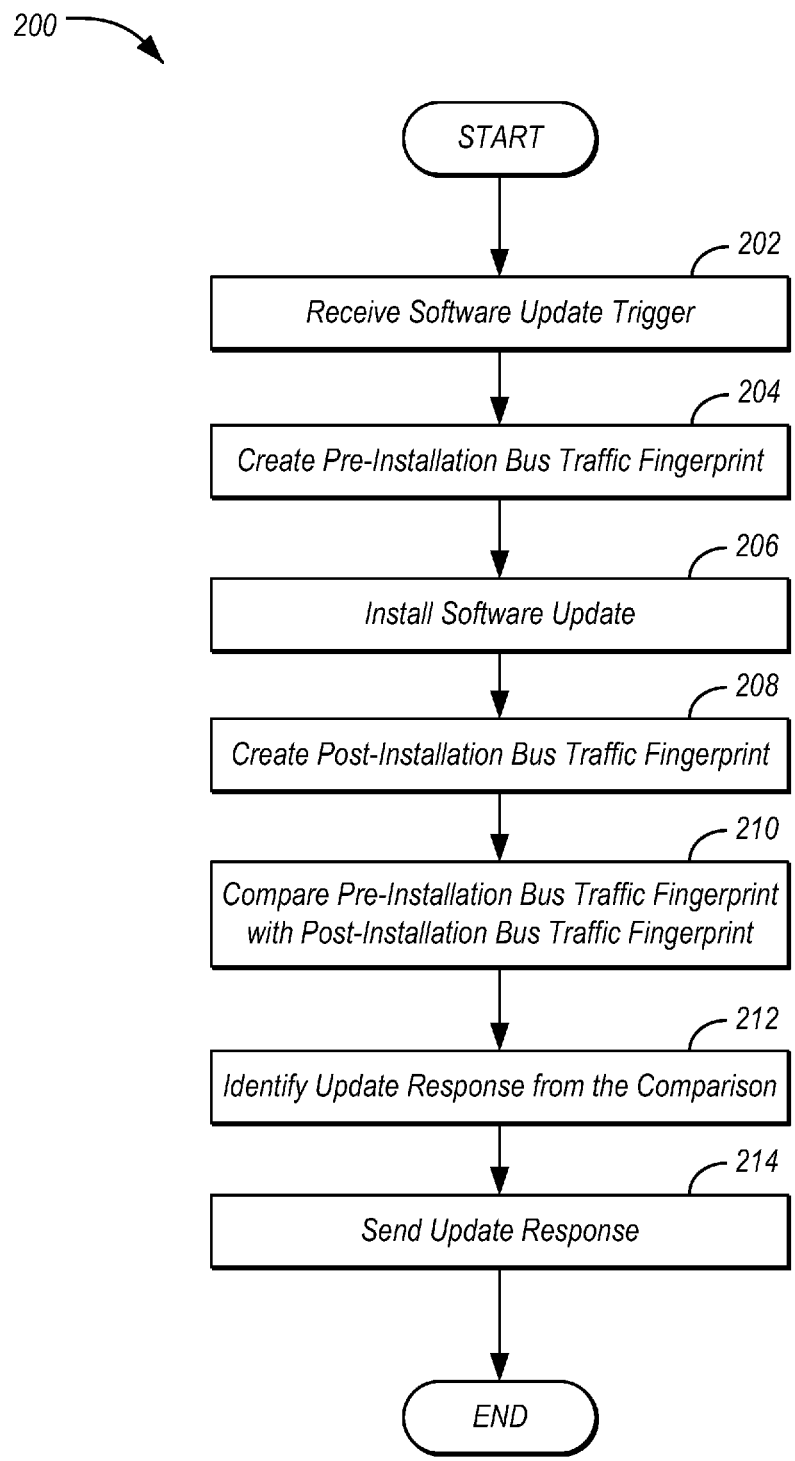
FIG. 2 illustrates an example process for performing pre- and post-update vehicle bus traffic fingerprinting.

FIG. 2 illustrates an example process 200 for performing pre- and post-update vehicle bus traffic fingerprinting. In an example the process 200 may be performed by the system 100 discussed in detail above.

At operation 202, the vehicle 102 receives a trigger for installation of a software update 116. In an example, the trigger may be received from the update server 118. As one possibility, the vehicle 102 may provide a configuration of itself to the update server 118 and may receive the trigger in response. Responsive to the trigger, the vehicle 102 may download the software update 116, e.g., from the update server 118 or from another location.

At 204, the vehicle 102 creates a pre-installation bus traffic fingerprint 122. In an example, responsive to receipt of the trigger, the gateway 110 may record data traffic from the subnets 112 indicating critical functional messages for a predefined number of drive cycles and/or may send a self-test request out over the subnets 112 to controllers 106 of the vehicle 102 with self-test capabilities. This information may be compiled into the pre-installation bus traffic fingerprint 122.

At 206, the vehicle 102 installs the software update 116. In an example, the gateway 110 may send the software update 116 to the controller 106 of the vehicle 102 that is to install the software update 116. The controller 106 may, in turn, install the update, and send a notification to the gateway 110 that the installation was completed.

At 208, the vehicle 102 creates a post-installation bus traffic fingerprint 122. In an example, responsive to receipt of the notification of installation of the software update 116, the gateway 110 may record data traffic from the subnets 112 indicating critical functional messages for a predefined number of drive cycles and/or may send a self-test request out over the subnets 112 to controllers 106 of the vehicle 102 with self-test capabilities. This information may be compiled into the post-installation bus traffic fingerprint 122.

At 210, the vehicle 102 compares the pre-installation bus traffic fingerprint 122 with the post-installation bus traffic fingerprint 204. The fingerprints 122 may be compared using various techniques. In a simple example, if diagnostic codes are included in the post-installation bus traffic fingerprint 122 but not in the pre-installation bus traffic fingerprint 122, then it can be inferred that there was an issue resulting from installation of the software update 116. Similarly, if diagnostic codes are included in the pre-installation bus traffic fingerprint 122 but not in the post-installation bus traffic fingerprint 122, then it can be inferred that the software update 116 resolved an issue.

As another example, the quantity of various messages being included in the pre-installation bus traffic fingerprint 122 may be compared with the quantity of the same messages as included in the post-installation bus traffic fingerprint 122. If the quantities differ, then it may be inferred that the software update 116 caused an issue, although it may not be clear from these results what the issue is. Additionally or alternately, machine learning algorithms may be trained using the pre-installation bus traffic fingerprint 122, and may be used to identify data in the post-installation bus traffic fingerprint 122 that differs from the structure of the data in the pre-installation bus traffic fingerprint 122. If there are substantial differences, then it may be inferred that the software update 116 caused an issue.

In some examples, the vehicle 102 may prompt the user for information if the comparison indicates a possible issue. In an example, the user may be prompted within the vehicle HMI to enter information that describes any changes the user may have experienced with the vehicle 102 since the installation of the software update 116.

At 212, the vehicle 102 identifies the update response 120 based on the comparison. In an example, the vehicle 102 may include the results of the comparison, and/or any information received from the user in the update response 120. The vehicle 102 sends the update response 120 at operation 214. In an example, the vehicle 102 may send the update response 120 to the update server 118. After operation 214, the process 200 ends.

Computing devices described herein, such as the controllers 106, TCU 108, and update server 118, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A system comprising:
a processor of a vehicle programmed to
create a pre-installation bus traffic fingerprint before installing a software update,
install the software update to the vehicle,
create a post-installation bus traffic fingerprint after installing the software update,
compare the pre-installation bus traffic fingerprint and the post-installation bus traffic fingerprint to identify success of the install of the software update, and
indicate the success of the install to an update server,
wherein to compare the pre-installation bus traffic fingerprint with the post-installation bus traffic fingerprint includes to utilize a machine learning algorithm trained using the pre-installation bus traffic fingerprint to identify data in the post-installation bus traffic fingerprint that differs from the structure of the data in the pre-installation bus traffic fingerprint, and infer that the software update caused an issue responsive to identifying differences in the structure of the data in the post-installation bus traffic fingerprint compared to the pre-installation bus traffic fingerprint.

2. The system of claim 1, wherein the processor is further programmed to receive the software update from the update server, and initiate the software update responsive to receipt of the software update.

3. The system of claim 1, wherein the processor is further programmed to, responsive to the comparing of the pre-installation bus traffic fingerprint and the post-installation bus traffic fingerprint identifying a lack of success, requesting input regarding vehicle function via a human-machine interface (HMI) of the vehicle.

4. The system of claim 1, wherein to create the pre-installation bus traffic fingerprint by the processor includes to record data traffic from subnets of a network of the vehicle, the data including critical functional messages recorded for a predefined number of drive cycles before installation of the software update.

5. The system of claim 4, wherein to create the post-installation bus traffic fingerprint by the processor includes to record data traffic from the subnets of the network of the vehicle, the data including critical functional messages recorded for the predefined number of drive cycles after installation of the software update.

6. The system of claim 4, wherein to create the pre-installation bus traffic fingerprint by the processor further includes to send a self-test request over the subnets to controllers of the vehicle having self-test capabilities, and to receive self-test results from the controllers responsive to the self-test request.

7. The system of claim 6, wherein to create the post-installation bus traffic fingerprint by the processor further includes to send a second self-test request over the subnets to controllers of the vehicle having self-test capabilities, and to receive second self-test results from the controllers responsive to the second self-test request.

8. The system of claim 1, wherein to compare the pre-installation bus traffic fingerprint with the post-installation bus traffic fingerprint includes to infer that there was an issue resulting from installation of the software update responsive to identifying diagnostic codes are included in the post-installation bus traffic fingerprint but not in the pre-installation bus traffic fingerprint.

9. The system of claim 1, wherein to compare the pre-installation bus traffic fingerprint with the post-installation bus traffic fingerprint includes to infer that there was success in installation of the software update responsive to identifying diagnostic codes are included in the pre-installation bus traffic fingerprint but not in the post-installation bus traffic fingerprint.

10. The system of claim 1, wherein to compare the pre-installation bus traffic fingerprint with the post-installation bus traffic fingerprint includes to compare a quantity of messages included in the pre-installation bus traffic fingerprint to a quantity of the same messages included in the post-installation bus traffic fingerprint, and when the quantities differ infer that the software update caused an issue.

11. A method comprising:
   downloading a software update to a vehicle from an update server responsive to an update trigger;
   creating a pre-installation bus traffic fingerprint responsive to completing the downloading;
   installing the software update responsive to creating the pre-installation bus traffic fingerprint;
   creating a post-installation bus traffic fingerprint responsive to installing the software update; and
   indicating success of the install to the update server based on comparing the pre-installation and post-installation bus traffic fingerprints,
   wherein the comparing of the pre-installation bus traffic fingerprint with the post-installation bus traffic fingerprint includes utilizing a machine learning algorithm trained using the pre-installation bus traffic fingerprint to identify data in the post-installation bus traffic fingerprint that differs from the structure of data in the pre-installation bus traffic fingerprint, and infer that the software update caused an issue responsive to identifying differences in the structure of the data in the post-installation bus traffic fingerprint compared to the pre-installation bus traffic fingerprint.

12. The method of claim 11, further comprising:
   including, in the pre-installation bus traffic fingerprint, self-test results from controllers of the vehicle captured before installing the software update; and
   including, in the post-installation bus traffic fingerprint, self-test results from controllers of the vehicle captured after installing the software update.

13. The method of claim 11, further comprising, responsive to the comparing of the pre-installation and post-installation bus traffic fingerprint identifying a lack of success, requesting input regarding vehicle function via a human-machine interface (HMI) of the vehicle.

14. The method of claim 11, further comprising:
   including, in the pre-installation bus traffic fingerprint, data traffic recorded from subnets of a vehicle network indicating critical functional messages for a predefined number of drive cycles before installing the software update; and
   including, in the post-installation bus traffic fingerprint, data traffic recorded from subnets of a vehicle network indicating critical functional messages for a predefined number of drive cycles after installing the software update.

15. A non-transitory computer-readable medium comprising instructions that, when executed by a processor of a gateway of a vehicle, cause a gateway to:
   download a software update from an update server responsive to an update trigger;
   create a pre-installation bus traffic fingerprint responsive to completion of the download, the pre-installation bus traffic fingerprint including data traffic recorded for a predefined number of drive cycles before installation of the software update to the vehicle from subnets of a vehicle network, the recorded data traffic including critical functional messages matched from a listing of critical messages types;
   install the software update to the vehicle responsive to creation of the pre-installation bus traffic fingerprint;
   create a post-installation bus traffic fingerprint responsive to installing the software update, the post-installation bus traffic fingerprint including further data traffic recorded for the predefined number of drive cycles after installation of the software update to the vehicle, the further recorded data traffic including critical functional messages matched from the listing of critical messages types;
   compare the pre-installation and post-installation bus traffic fingerprints; and
   indicate success of the install to the update server responsive to a result of the comparison,
   wherein to compare the pre-installation bus traffic fingerprint with the post-installation bus traffic fingerprint includes to utilize a machine learning algorithm trained using the pre-installation bus traffic fingerprint to identify data in the post-installation bus traffic fingerprint that differs from the structure of the data in the pre-installation bus traffic fingerprint, and infer that the software update caused an issue responsive to identifying differences in the structure of the data in the post-installation bus traffic fingerprint compared to the pre-installation bus traffic fingerprint.

* * * * *